United States Patent
Vinayachandran et al.

(10) Patent No.: US 12,526,054 B2
(45) Date of Patent: Jan. 13, 2026

(54) SYMBOL CONSTELLATION GENERATION APPARATUS, CONTROL METHOD, AND COMPUTER-READABLE STORAGE MEDIUM

(71) Applicant: NEC Corporation, Tokyo (JP)

(72) Inventors: Ankith Vinayachandran, Tokyo (JP); Emmanuel Le Taillandier de Gabory, Tokyo (JP); Naoto Ishii, Tokyo (JP); Norifumi Kamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 362 days.

(21) Appl. No.: 18/275,484

(22) PCT Filed: Feb. 8, 2021

(86) PCT No.: PCT/JP2021/004606
§ 371 (c)(1),
(2) Date: Aug. 2, 2023

(87) PCT Pub. No.: WO2022/168317
PCT Pub. Date: Aug. 11, 2022

(65) Prior Publication Data
US 2024/0097791 A1    Mar. 21, 2024

(51) Int. Cl.
*H04B 10/2507*    (2013.01)
*H04B 10/2543*    (2013.01)
(Continued)

(52) U.S. Cl.
CPC ....... *H04B 10/516* (2013.01); *H04B 10/2507* (2013.01); *H04B 10/2543* (2013.01); *H04B 10/58* (2013.01)

(58) Field of Classification Search
CPC ............ H04B 10/2507; H04B 10/2543; H04B 10/516; H04B 10/58
(Continued)

(56) References Cited

U.S. PATENT DOCUMENTS 10,148,465 B2    12/2018    Jia et al.
2017/0170993 A1*    6/2017    Jia ..................... H04L 25/03006
(Continued)

FOREIGN PATENT DOCUMENTS

| | | |
|---|---|---|
| CN | 109660297 A | 4/2019 |
| JP | 2000-209150 A | 7/2000 |

(Continued)

OTHER PUBLICATIONS

International Search Report for PCT Application No. PCT/JP2021/004606, mailed on Apr. 27, 2021.
(Continued)

*Primary Examiner* — Li Liu

(57) ABSTRACT

A symbol constellation generation apparatus (2000) acquires specification information (10) of the optical communication system (100). The symbol constellation generation apparatus (2000) uses a first prediction model (50) to generate noise characteristics information (20) based on the specification information (10). The symbol constellation generation apparatus (2000) uses a second prediction model (60) to generate symbol constellation (30) suited to the optical communication system having the noise characteristics represented by the noise characteristics information (20).

5 Claims, 5 Drawing Sheets

(51) Int. Cl.
  *H04B 10/516* (2013.01)
  *H04B 10/58* (2013.01)
(58) Field of Classification Search
  USPC .................... 398/158, 159, 183, 192–194
  See application file for complete search history.

(56) References Cited

U.S. PATENT DOCUMENTS

2019/0393965 A1* 12/2019 Zhang ................ H04L 27/2096
2020/0112777 A1*  4/2020 Schmalen ............. H04B 10/61
2022/0247614 A1*  8/2022 Hoydis ............ H04L 25/03165

FOREIGN PATENT DOCUMENTS

| JP | 2017-537490 A | | 12/2017 |
|---|---|---|---|
| JP | 2019041285 A | * | 3/2019 |
| WO | 2019/246605 A1 | | 12/2019 |
| WO | 2020/239232 A1 | | 12/2020 |

OTHER PUBLICATIONS

English translation of Written opinion for PCT Application No. PCT/JP2021/004606, mailed on Apr. 27, 2021.
Rasmus T. Jones et al., "Deep Learning of Geometric Constellation Shaping including Fiber Nonlinearities", Computer Research Repository, arXiv:1805.03785, May 10, 2018.
JP Office Action for JP Application No. 2023-544704, mailed on Oct. 1, 2024 with English Translation.
Tao Liu et al., "Optimal Signal Constellation Design for Coherent Optical Channels Dominated by the Nonlinear Phase Noise", 2014 16th International Conference on Transparent Optical Networks (ICTON), 2014, pp. 1-4.

\* cited by examiner

SYMBOL CONSTELLATION GENERATION APPARATUS, CONTROL METHOD, AND COMPUTER-READABLE STORAGE MEDIUM

This application is a National Stage Entry of PCT/JP2021/004606 filed on Feb. 8, 2021, the contents of all of which are incorporated herein by reference, in their entirety.

TECHNICAL FIELD

The present disclosure generally relates to a symbol constellation used in optical communication systems.

BACKGROUND ART

In an optical communication system, an optical transmitter converts a message into a sequence of symbols, and send the sequence of symbols to an optical receiver. This conversion from a message to symbols is performed using a symbol constellation, which represents an association between a bit pattern in a message and a symbol to be sent, for each bit pattern. It is effective for the performance improvement of the optical communication system to provide an appropriate symbol constellation that can pre-compensates the nonlinearity of the optical communication system.

As a way of generating a symbol constellation, PTL 1 and NPL1 disclose an end-to-end learning system including an autoencoder that models an optical communication system. By repeatedly updating trainable parameters, including a symbol constellation, of the learning system, it is possible to obtain the symbol constellation customized for the optical communication system that is modeled by the learning system.

CITATION LIST

Patent Literature

PTL1: CN patent application publication No. CN 109660297

Non Patent Literature

NPL1: Rasmus T. Jones, Tobias A. Eriksson, Metodi P. Yankov, and Darko Zibar, "Deep Learning of Geometric Constellation Shaping including Fiber Nonlinearities", Computer Research Repository, arXiv:1805.03785, May 10, 2018

SUMMARY OF INVENTION

Technical Problem

It is a time-consuming task to obtain a symbol constellation using the end-to-end learning system mentioned above since the training of the learning system involves repetitive update of the trainable parameters thereof. An objective of the present disclosure is to provide a technique to reduce time to generate a symbol constellation for an optical communication system.

Solution to Problem

The present disclosure provides a symbol constellation generation apparatus that comprises at least one processor and memory storing instructions. The at least one processor is configured to execute the instructions to: acquire specification information that represents one or more elements of a specification of an optical communication system, the optical communication system comprising an optical transmitter, an optical receiver, and an optical fiber therebetween; generate noise characteristics information using the acquired specification information and a first prediction model, the noise characteristics information representing one or more noise characteristics of the optical communication system, the first prediction model being predefined and representing associations between the specification of the optical communication system and noise characteristics of the optical communication system having the specification associated therewith; and generate a symbol constellation using the generated noise characteristics information and a second prediction model, the symbol constellation being to be used by the optical transmitter to encode a message to be sent to the optical receiver, the second prediction model being predefined and representing associations between the noise characteristics of the optical communication system and the symbol constellation suited to the optical communication system having the noise characteristics associated therewith.

The present disclosure provides a control method performed by a computer. The control method comprises: acquiring specification information that represents one or more elements of a specification of an optical communication system, the optical communication system comprising an optical transmitter, an optical receiver, and an optical fiber therebetween; generating noise characteristics information using the acquired specification information and a first prediction model, the noise characteristics information representing one or more noise characteristics of the optical communication system, the first prediction model being predefined and representing associations between the specification of the optical communication system and noise characteristics of the optical communication system having the specification associated therewith; and generating a symbol constellation using the generated noise characteristics information and a second prediction model, the symbol constellation being to be used by the optical transmitter to encode a message to be sent to the optical receiver, the second prediction model being predefined and representing associations between the noise characteristics of the optical communication system and the symbol constellation suited to the optical communication system having the noise characteristics associated therewith.

The present disclosure provides a computer-readable storage medium storing a program that causes a computer to execute: acquiring specification information that represents one or more elements of a specification of an optical communication system, the optical communication system comprising an optical transmitter, an optical receiver, and an optical fiber therebetween; generating noise characteristics information using the acquired specification information and a first prediction model, the noise characteristics information representing one or more noise characteristics of the optical communication system, the first prediction model being predefined and representing associations between the specification of the optical communication system and noise characteristics of the optical communication system having the specification associated therewith; and generating a symbol constellation using the generated noise characteristics information and a second prediction model, the symbol constellation being to be used by the optical transmitter to encode a message to be sent to the optical receiver, the second prediction model being predefined and representing associations between the noise characteristics of the optical communication system and the symbol constellation suited to the optical communication system having the noise characteristics associated therewith.

Advantageous Effects of Invention

According to the present disclosure, a technique to reduce time to generate a symbol constellation for an optical communication system is provided.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary.

First Example Embodiment

Overview

Figure 1:
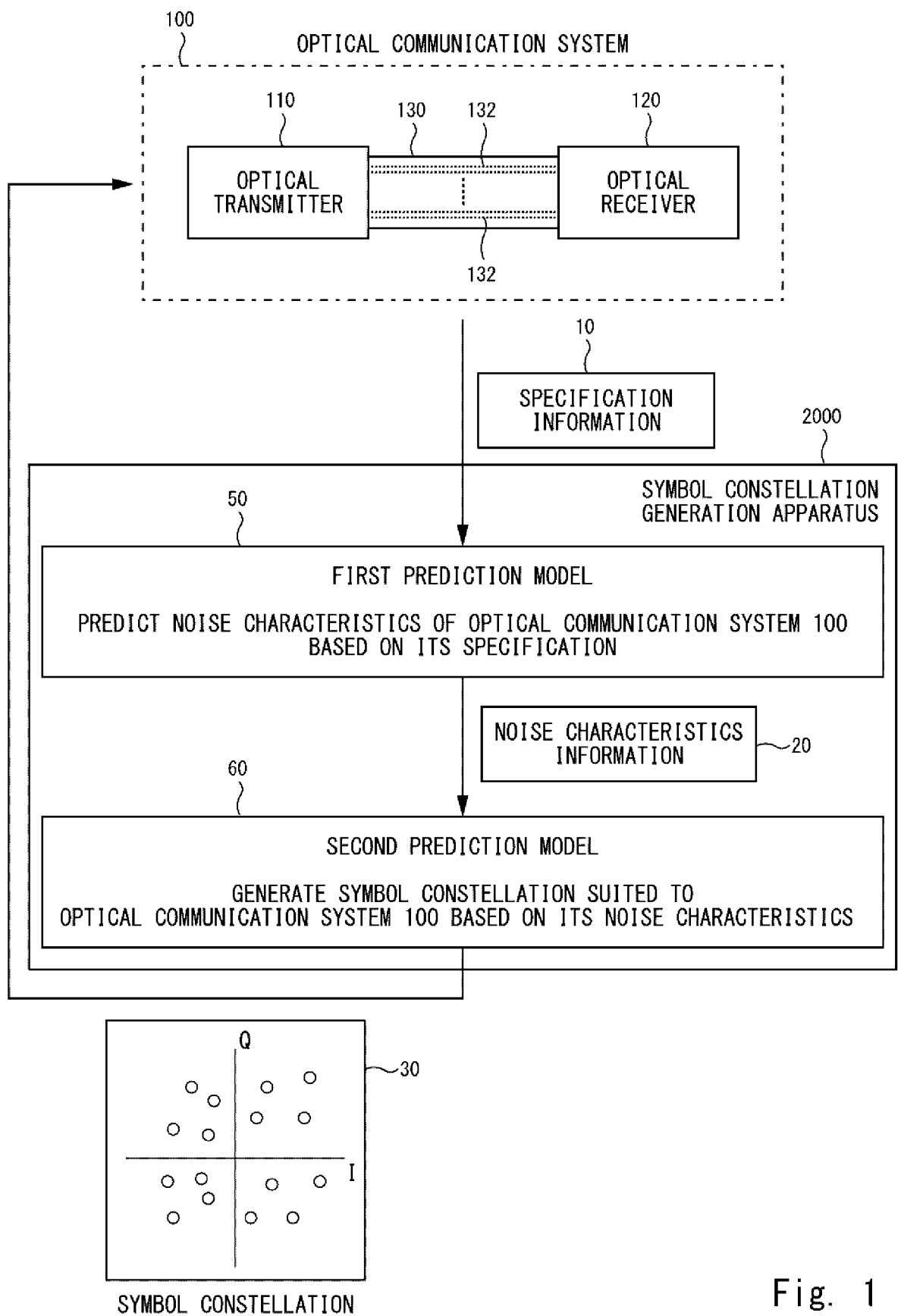
FIG. 1 illustrates an overview of a symbol constellation generation apparatus of the 1st example embodiment.

FIG. 1 illustrates an overview of a symbol constellation generation apparatus 2000 of the first example embodiment. Note that the overview illustrated by FIG. 1 shows an example of operations of the symbol constellation generation apparatus 2000 to make it easy to understand the symbol constellation generation apparatus 2000, and does not limit or narrow the scope of possible operations of the symbol constellation generation apparatus 2000.

The symbol constellation generation apparatus 2000 generates a symbol constellation 30, which is a symbol constellation suited to an optical communication system 100. An example of a type of the optical communication system 100 may be a coherent optical communication system over an optical fiber with Wavelength Division Multiplexing (WDM) capability. The optical communication system 100 includes an optical transmitter 110, an optical receiver 120, and an optical fiber 130. The optical transmitter 110 encodes a message using the symbol constellation 30, and send the encoded message to the optical receiver 120 through the optical fiber 130. The optical receiver 120 receives the encoded message sent from the optical transmitter 110 through the optical fiber 130. With the WDM capability, the optical fiber 130 is divided into multiple communication channels 132.

The symbol constellation generation apparatus 2000 generates the symbol constellation 30 based on the specification of the optical communication system 100. Specifically, the symbol constellation generation apparatus 2000 predicts noise characteristics of the optical communication system 100 based on the specification of the optical communication system 100, and then generates, based on the predicted noise characteristics of the optical communication system 100, the symbol constellation 30 that is suited to the optical communication system 100 having the predicted noise characteristics.

To do so, the symbol constellation generation apparatus 2000 acquires specification information 10 that represents one or more elements of the specification of the optical communication system 100, and generate noise characteristics information 20 that represents one or more elements of the noise characteristics of the optical communication system 100. The noise characteristics of the optical communication system 100 are predicted using the specification information 10 and a first prediction model 50. The first prediction model 50 is predefined and represents associations between the specification of the optical communication system 100 and the noise characteristics of the optical communication system 100 having the corresponding specification.

Then, the symbol constellation generation apparatus 2000 generates the symbol constellation 30 using the noise characteristics information 20 and a second prediction model 60. The second prediction model 60 is predefined and represents associations between the noise characteristics of the optical communication system 100 and the symbol constellation 30 that is suited to the optical communication system 100 having the corresponding noise characteristics.

Example of Advantageous Effect

As mentioned above, the symbol constellation generation apparatus 2000 uses the first predication model 50 to predict the noise characteristics of the optical communication system 100 having the specification represented by the specification information 10, and then uses the second prediction model 60 to generate the symbol constellation 30 suited to the optical communication system 100 having the predicted noise characteristics. Since the first prediction model 50 and the second prediction model 60 are defined in advance, it is not necessary for the symbol constellation generation apparatus 2000 to perform repetitive updates of those models at the time of generating the symbol constellation 30 unlike the end-to-end learning system disclosed by PTL1 or NPL1. Thus, the symbol constellation generation apparatus 2000 can generate the symbol constellation 30 with time less than the end-to-end learning system disclosed by PTL1 or NPL1.

In addition, since the symbol constellation generation apparatus 2000 takes the noise characteristics of the optical communication system 100 into consideration, it is possible to generate the symbol constellation 30 that is suited to the optical communication system having the predicted noise characteristics. Thus, the system 2000 can generate the symbol constellation 30 that can improve the performance of the optical communication system 100 with time less than the end-to-end learning system disclosed by PTL1 or NPL1.

Hereinafter, more detailed explanation of the symbol constellation generation apparatus 2000 will be described.

Example of Functional Configuration

Figure 2:
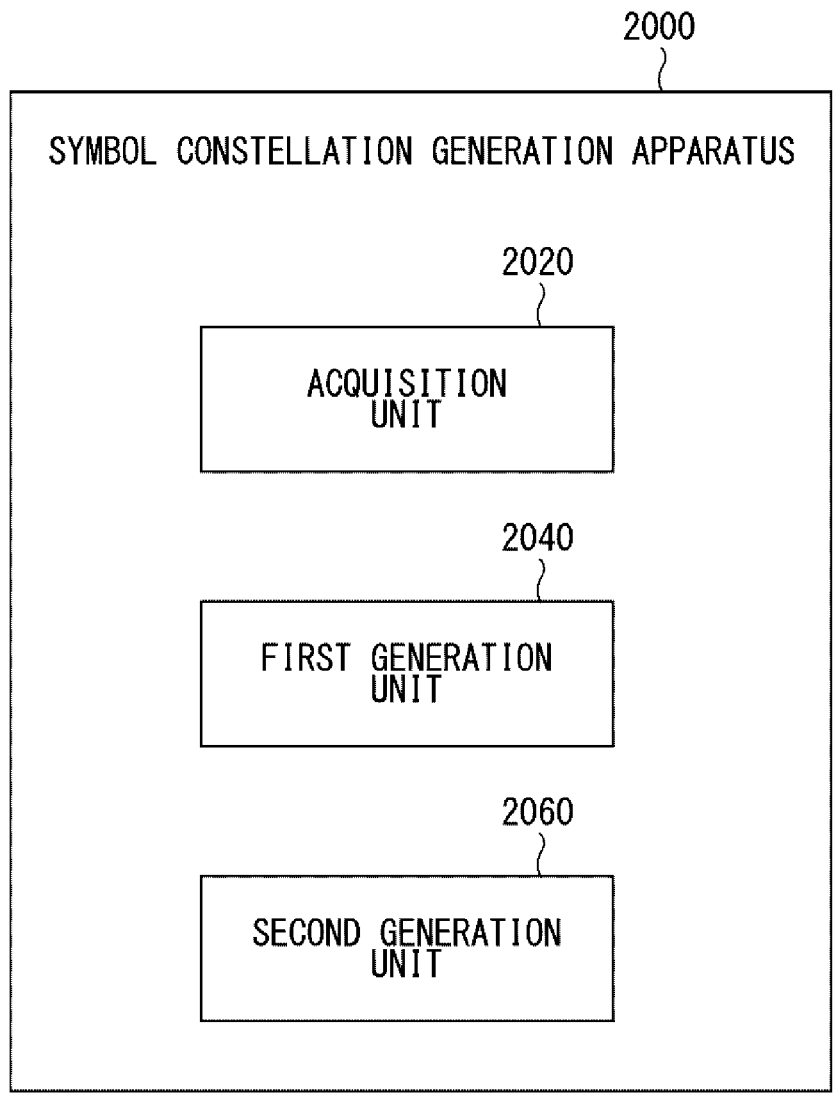
FIG. 2 is a block diagram illustrating an example of a functional configuration of the symbol constellation generation apparatus.

FIG. 2 illustrates an example of a functional configuration of the symbol constellation generation apparatus 2000. The symbol constellation generation apparatus 2000 includes an acquisition unit 2020, a first generation unit 2040, and a second generation unit 2060. The acquisition unit 2020 acquires the specification information 10. The first generation unit 2040 generates the noise characteristics information 20 using the specification information 20 and the first prediction model 50. The second generation unit 2060 generates the symbol constellation 30 using the noise characteristics information 20 and the second prediction model 60.

Example of Hardware Configuration

The symbol constellation generation apparatus 2000 may be realized by one or more computers. Each of the one or more computers may be a special-purpose computer manufactured for implementing the symbol constellation generation apparatus 2000, or may be a general-purpose computer like a personal computer (PC), a server machine, or a mobile device.

The symbol constellation generation apparatus 2000 may be realized by installing an application in the computer. The application is implemented with a program that causes the computer to function as the symbol constellation generation apparatus 2000. In other words, the program is an implementation of the functional units of the symbol constellation generation apparatus 2000.

Figure 3:
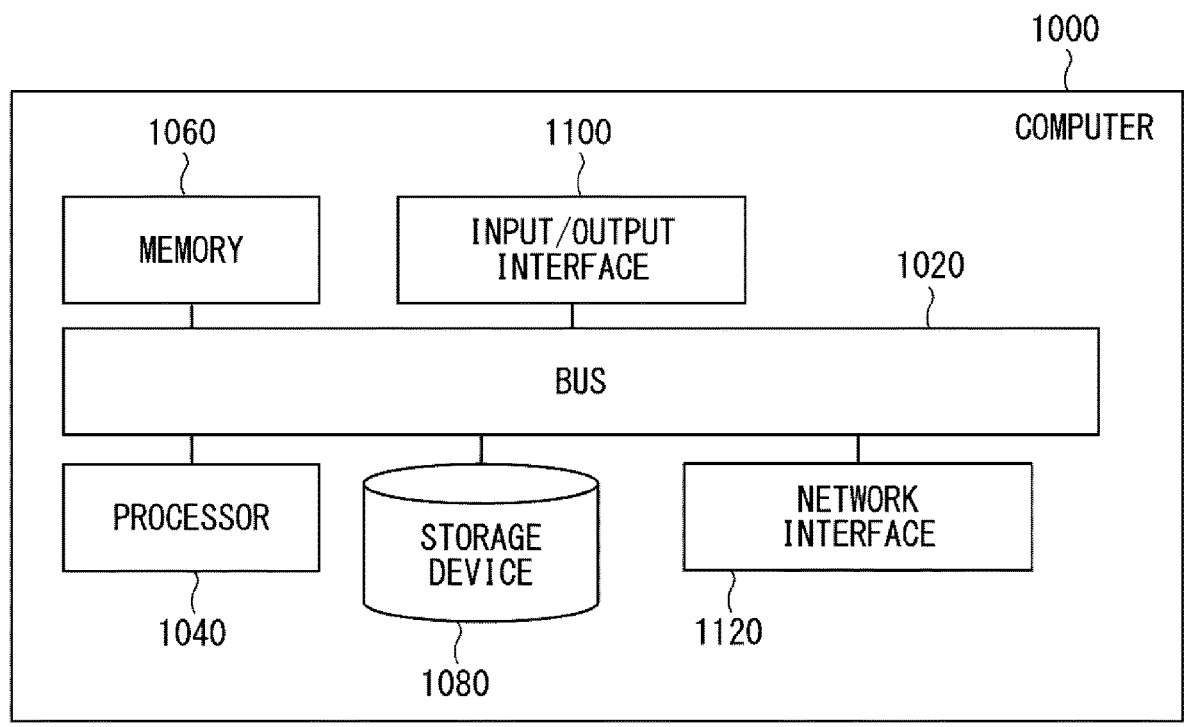
FIG. 3 is a block diagram illustrating an example of the hardware configuration of a computer realizing the symbol constellation generation apparatus.

FIG. 3 is a block diagram illustrating an example of the hardware configuration of a computer 1000 realizing the symbol constellation generation apparatus 2000. In FIG. 3, the computer 1000 includes a bus 1020, a processor 1040, a memory 1060, a storage device 1080, an input/output interface 1100, and a network interface 1120.

The bus 1020 is a data transmission channel in order for the processor 1040, the memory 1060, the storage device 1080, and the input/output interface 1100, and the network interface 1120 to mutually transmit and receive data. The processor 1040 is a processor, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The input/output interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network).

The storage device 1080 may store the program mentioned above. The processor 1040 executes the program to realize each functional unit of the symbol constellation generation apparatus 2000.

The hardware configuration of the computer 1000 is not limited to the configuration shown in FIG. 3. For example, as mentioned-above, the symbol constellation generation apparatus 2000 may be realized by plural computers. In this case, those computers may be connected with each other through the network.

Flow of Process

Figure 4:
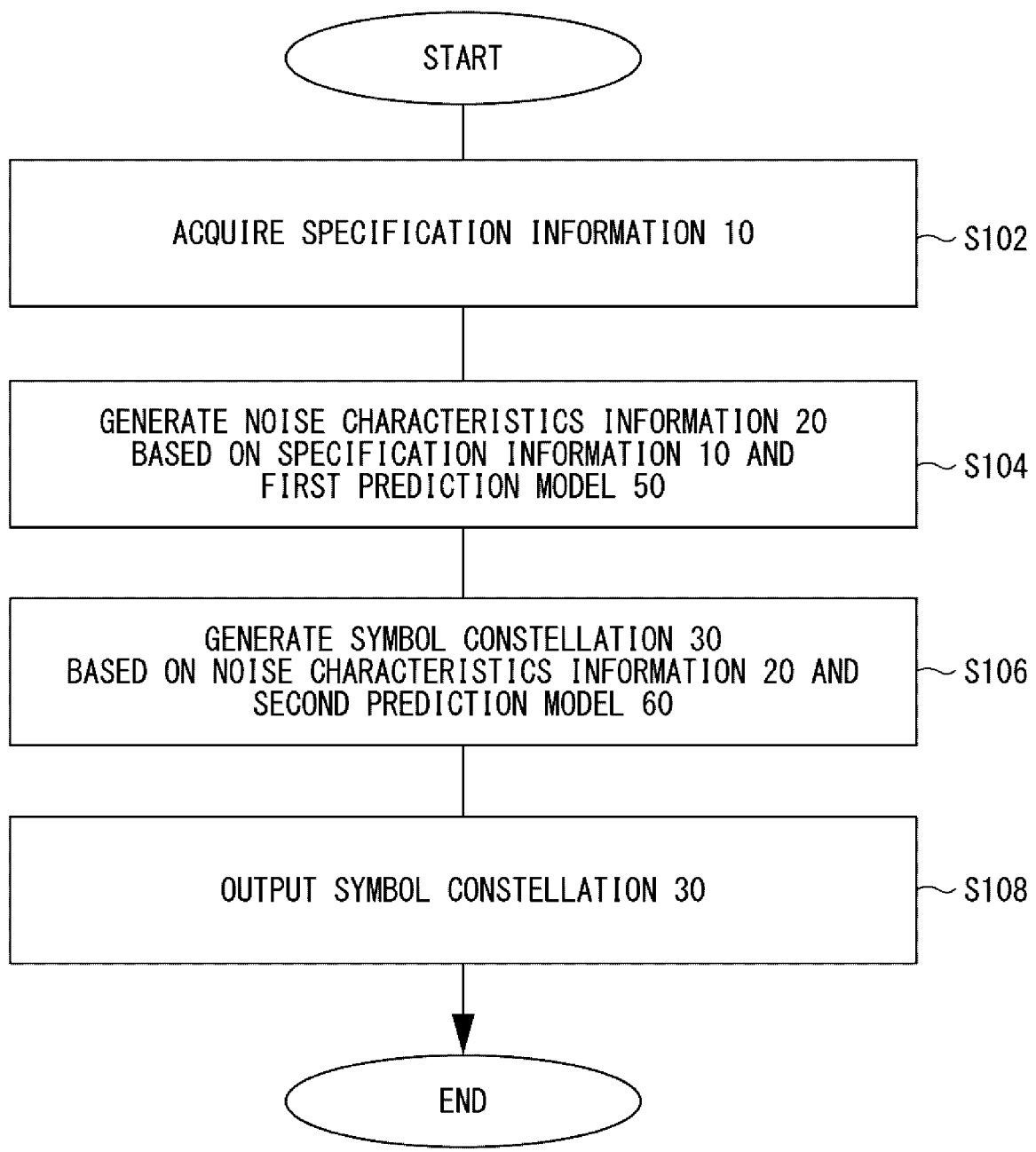
FIG. 4 shows a flowchart illustrating an example of an overall flow of process performed by the symbol constellation generation apparatus.

FIG. 4 is a flowchart illustrating an example of a process performed by the symbol constellation generation apparatus 2000. The acquisition unit 2020 acquires the specification information 10 (S102). The first generation unit 2040 generates the noise characteristics information 20 based on the specification information 10 (S104). The second generation unit 2060 generates the symbol constellation 30 based on the noise characteristics information 20 (S106). The symbol constellation generation apparatus 2000 outputs the symbol constellation 30 (S108).

Acquisition of Specification Information: S102

The acquisition unit 2020 acquires the specification information 10 (S102). The specification information 10 represents one or more elements of the specification of the optical communication system 100. Each element of the specification may be a parameter related to transmission or communication channel condition: e.g., fiber specifications of the optical fiber 130; frequency specifications of the optical fiber 130; launch power specifications of the communication channel 132 of interest; the number of the communication channels 132 operating and adjacent to one of interest; and characteristics of intermediate amplification systems. Note that the communication channel 132 of interest is one through which the optical transmitter 110 transmits symbols that is encoded using the symbol constellation 30.

The fiber specifications of the optical fiber 130 may include the fiber coefficients $\alpha$, $\beta\_2$, $\gamma$, the number of spans, and the length thereof. Note that the fiber coefficients $\alpha$, $\beta\_2$, and $\gamma$ represent the fiber loss coefficient, the dispersion loss coefficient, and the nonlinearity coefficient, respectively. The frequency specifications of the optical fiber 130 may include the center frequency, the channel spacing, and the number of the communication channels 132 included therein.

Note that if an element of the system specification related to not all of the communication channels 132 can be changed, the symbol constellation generation apparatus 2000 may generate the different symbol constellation 30 for each of the communication channels 132. The optical transmitter 110 may use the different symbol constellation 30 for each of the communication channel 132.

In this case, the specification information 10 may include an identifier of the communication channel 132 and the elements of the specification related to the corresponding communication channel 132. The symbol constellation generation apparatus 2000 determines for which communication channel 132 it generates the symbol constellation 30 based on the identifier of the communication channel 132 shown by the specification information 10. An example of such the element of the system specification is the number of the communication channels 132 operating and adjacent to one of interest.

There are various ways to acquire the specification information 10. For example, the acquisition unit 2020 may acquire the specification information 10 from a storage device in which the specification information 10 is stored in advance and to which the symbol constellation generation apparatus 2000 has access. In another example, the acquisition unit 2020 may receive the specification information 10 that is sent from another computer. In another example, the acquisition unit 2020 may provide a user interface with which a user of the symbol constellation generation apparatus 2000 can manually input the specification of the optical communication system 100, and acquire the input data as the specification information 10.

Generation of Noise Characteristics Information: S104

The first generation unit 2020 generates the noise characteristics information 20 based on the specification information 10 (S104). The noise characteristics information 20 represents characteristics of the noise that is introduced in the optical communication system 100. For example, the noise characteristics of the optical communication system 100 may include ASE (amplified spontaneous emission) noise that is introduced in the optical setup. In another example, the noise characteristics of the optical communication system 100 may include NLI (nonlinear interference) noise, which gives an estimate of the nonlinear distortions affecting the signal transmission. This includes the effects of SPM (Self Phase Modulation), XPM (Cross Phase modulation), FWM (Four-Wave Mixing), etc., which are fiber nonlinearity effects.

The noise characteristics of the optical communication system 100 may be represented using a noise model, such as Gaussian-noise (GN) model for WDM channel. The GN model for WDM channel states that the nonlinearity associated with dispersion uncompensated signal follows a Gaussian distribution with variance obtained from the system specifications. Specifically, the GN model for WDM channel can be defined as follows:

Equation 1

$$X \sim N(0, n) \tag{1}$$

where X represents a value of the noise, and is normally distributed with the mean value being zero and the variance being n.

The first generation unit 2040 predicts the parameters of the noise model with which the noise characteristics of the optical communication system 100 is represented, and generates the noise characteristics information 20 that includes the predicted parameters of the noise model. When using the GN model defined by the equation (1), the first generation unit 2040 predicts the variance n based on the specification of the optical communication system 100. Note that not only GN model but also any other models already existing or being proposed in the future which model optical communication can be used to implement the first generation unit 2040 by just changing the data.

The first generation unit 2040 uses the first prediction model 50 to predict the parameters of the noise model. There may be various ways of implementing such the first prediction model 50. For example, the first predication model 50 may be implemented as a predetermined mathematical function. The mathematical function to be used depends on the type of the noise to be computed. In the case where the ASE noise in the optical communication system 100 is modeled by the GN model to represent the noise characteristics of the optical communication system 100, the variance n of the GN model can be computed based on the following equation (2):

Equation 2

$$n_{ASE} = 10^{\frac{NF}{10}} h v R \sum_k 10^{\frac{A_k}{10}} \tag{2}$$

where n_ASE represents the variance n of the GN model that represents the ASE noise, NF represents the noise figure of the optical amplifier, h represents the Plank's constant, v represents the channel carrier optical frequency, R represents the symbol rate, and A_k represents the transmission losses between the k−1 to k segment (one span).

In the case where the NLI noise in the optical communication system 100 is modeled by the GN model to represent the noise characteristics of the optical communication system 100, the variance n of the GN model can be computed using the following equation (3) and (4):

Equation 3

$$X_{i,j} \propto \gamma^2 L^2 N_s \phi(\alpha, \beta_2, f, \Delta f) \tag{3}$$

Equation 4

$$n_{NLI_i} = P_i \sum_j X_{i,j} P_j^2 \tag{4}$$

In the equation (3), the identifier i and j represents the channels in the WDM where i th channel is affected by the conditions of the j th channel. X_i,j represents the efficiency factor nonlinear interference. Specifically, X_i,j represents SPM when i=j, and XPM otherwise. α, β_2, and γ are the fiber coefficients of the optical fiber 130. L represents the length of the optical fiber 130. N_s represents the number of spans of the optical fiber 130. f and Δf represent the center frequency and the channel spacing of the communication channel 132, respectively. φ is a functional notation to represent a fact that X_i,j depends on α, β_2, γ, f, and Δf.

In the equation (4), n_NLI_i represents the variance n of the GN model that represents the NLI noise for the communication channels 132 whose identifier is i. P_i represents the transmit power of the i th channel.

In another example, the first prediction model 50 may be implemented as a machine learning-based model to compute the parameters of the noise model. An example of a machine learning-based model used as the first prediction model 50 may be a neural network. In this neural network, an input layer takes the elements of the specification of the optical communication system 100 that is shown in the specification information 10 as input data, hidden layers analyze the input data, and an output layer outputs one or more parameters of the noise model (e.g., the variance n of the GN model) that represents the noise characteristics of the optical communication system 100 having the specification represented by the specification information 10.

The first prediction model 50 is trained in advance by repeatedly updating its trainable parameters (e.g., weights between nodes of the neural network) using a plurality of training data. The training data may include a combination of an input data and a ground-truth data. Specifically, the input data includes a set of elements of the specification of the optical communication system 100, while the ground-truth data includes the parameters of the noise model that is to be output from the first prediction model 50 in response to the corresponding input data being input thereinto.

In order to train the first prediction model 50, the ground-truth data of the noise characteristics are to be prepared for various types of the specification of the optical communication system 100. For example, the ground-truth data may be generated based on results of experiments. Specifically, the optical communication system 100 is operated under various specifications, and the characteristics of the noise introduced in the optical communication system 100 are measured or computed for each specification. As a result, a pair of the specification of the optical communication system 100 and the noise characteristics is obtained for each one of various specifications. In another example, the ground-truth data may be generated using mathematical models mentioned above.

The noise characteristics are not necessarily represented by one or more parameters of a noise model, such as the variance of GN model. For example, the noise characteristics of the optical communication system 100 may be represented by a distribution for the nonlinearity (hereinafter, nonlinearity distribution) that shows a nonlinear relationship between a transmission signal that is transmitted by the optical transmitter 110 and a reception signal that is received by the optical receiver 120. In this case, the first predication model 50 may be trained using experimental data to learn the relationship between the nonlinearity distribution and the specification of the optical communication system 100.

Specifically, the experimental data are generated by changing the specifications to some of the possible specification states and generating sufficient reception signals associated with these states in order to compute the nonlinearity distribution. The number of specification states used is ensured to be sufficient in terms of volume of data needed to accurately model the prediction model 50. The specification states include the possible specification changes such as change in number of transmitting channels, changes in transmitting power and other possible changes. For each such state, some fixed amounts of transmission signals are utilized in order to generate reception signals. These pairs of the transmission signal and the reception signal are then utilized to establish the nonlinearity distribution corresponding to the specification state. This generated data then used to train the prediction model 50.

<Generation of Symbol Constellation 30: S106>

The second generation unit 2060 generates the symbol constellation 30 based on the noise characteristics information 20 (S106). The symbol constellation 30 represents symbol constellation that is to be used by the optical transmitter 110 to send a message to the optical receiver 120. The symbol constellation 30 represents associations between a bit pattern in the message and a symbol (i.e., a coordinate in the symbol constellation map) to be used for the corresponding bit pattern, for each possible bit pattern. The optical transmitter 110 converts each bit pattern in the messages into one of symbols represented by the symbol constellation 30.

The second generation unit 2060 uses the second prediction model 60 to generate the symbol constellation 30. The second predication model 60 may be implemented as a machine learning-based model that is trained in advance so as to generate the symbol constellation 30 suited to the optical communication system 100 whose characteristics of noise are represented by the noise characteristics information 20 input thereinto. The second generation unit 2060 generates the symbol constellation 30 by inputting the noise characteristics information 20 generated by the first generation unit 2040 into the second prediction model 60 and obtaining the symbol constellation 30 output from the second prediction model 60.

An example of a machine learning-based model used as the second prediction model 60 is a neural network. In this neural network, an input layer takes the noise characteristics information 20 as input data, hidden layers analyze the input data (e.g., the parameters of the noise model shown by the noise characteristics information 20), and an output layer outputs the symbol constellation 30 that is suited to the optical communication system 100 whose noise characteristics are represented by the noise characteristics information 20 input thereinto.

The second prediction model 60 is trained in advance by repeatedly updating its trainable parameters using a plurality of training data. The training data may include a combination of an input data and a ground-truth data. The input data includes the data representing the noise characteristics of the optical communication system 100, such as the parameters of the noise model (e.g., the variance n of the GN model) for each of one or more types of noises, or the nonlinearity distribution that shows the nonlinear relationship between the transmission signal and the reception signal. The ground-truth data includes the symbol constellation 30 that is to be output from the second prediction model 60 in response to the corresponding input data being input into the second prediction model 60.

In order to train the second prediction model 60, the ground-truth data of the symbol constellation 30 are to be prepared for various noise characteristics of the optical communication system 100. For example, the ground-truth data can be generated using a geometric shaping algorithm. An example implementation of the geometric shaping algorithm is an end-to-end learning system which includes an autoencoder. By running this learning system with various specifications of the optical communication system, it is possible to obtain multiple sets of the noise characteristics and a symbol constellation that is suited to the optical communication system 100 having the corresponding noise characteristics. Each of the obtained sets can be used as a training data. Note that a concrete way of using the end-to-end learning system to obtain a symbol constellation suited to an optical communication system is disclosed, for example, by PTL1 or NPL1, and thus a well-known technique.

Output of Symbol Constellation 30

The symbol constellation generation apparatus 2000 may output the symbol constellation 30 in such a way that the optical transmitter 110 can use the symbol constellation 30 to encode messages. For example, the symbol constellation generation apparatus 2000 may put the symbol constellation 30 into a storage device to which the optical transmitter 110 also has access (in other words, a storage device that is shared with the symbol constellation generation apparatus 2000 and the optical transmitter 110). In another example, the symbol constellation generation apparatus 2000 may send the symbol constellation 30 to the optical transmitter 110.

Example Operation of Optical Communication System 100

Figure 5:
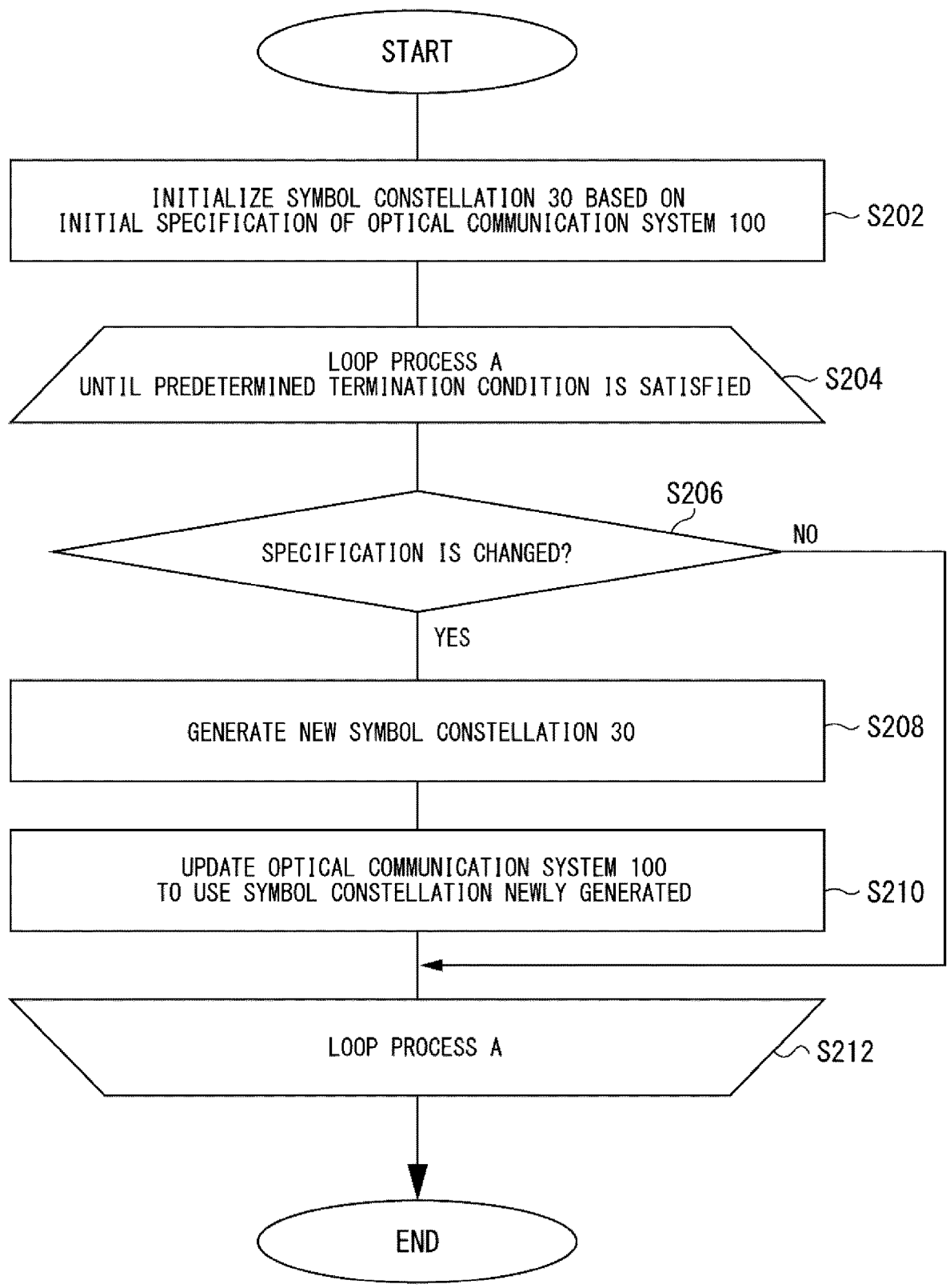
FIG. 5 shows a flowchart illustrating an example of an overall flow of a management of the optical communication system 100.

As a reference, an example of an operation of the optical communication system 100 will be explained referring to FIG. 5. FIG. 5 shows a flowchart illustrating an example of an overall flow of a management of the optical communication system 100. During the operation of the optical communication system 100, its specification is possibly changed multiple times. Thus, in this example, the symbol constellation 30 to be used by the optical transmitter 110 is repeatedly updated in response to the change in the specification of the optical communication system 100. By doing so, it is possible to efficiently operate the optical communication system 100 even if the specification of the optical communication system 100 is changed during its operation.

Before starting the operation of the optical communication system 100, the symbol constellation 30 is initialized based on the initial specification of the optical communication system 100 (S202). Hereinafter, this stage is called "offline stage". In the offline stage, the symbol constellation 30 may be generated by the symbol constellation 30 generation apparatus 2000 or another apparatus. In the latter case, the symbol constellation 30 can be generated by, for example, the end-to-end learning system with an autoencoder such as ones disclosed by PTL1 or NPL1. Note that although it is mentioned that it is a time-consuming task to generate the symbol constellation using the end-to-end learning system, it may be acceptable to use this system in the offline stage.

After starting the operation of the optical communication system 100, the symbol constellation generation apparatus 2000 is used to update the symbol constellation 30. The stage during which the optical communication system 100 is operated is called "online stage". In order to update the symbol constellation 30 in response to the change in the specification of the optical communication system 100, the optical communication system 100 is monitored during the online stage so as to detect the change in the specification of the optical communication system 100. For example, a network management and monitoring system may monitor the optical communication system 100 by using sensors and online performance to detect or recommend changes in the system specifications of the optical communication system 100.

The operation of the optical communication system 100 is depicted as a loop process A (S204-S212). The loop process A continues until a predetermined termination condition, such as "a predetermined time passes", is satisfied. In the step S206, it is determined whether or not the specification of the optical communication system 100 is changed. In the case where it is determined that the specification of the optical communication system 100 is changed (S206: YES), the symbol constellation generation apparatus 2000 generates a new symbol constellation 30 by performing, for example, the steps S102 to S108 shown by FIG. 4 (S208). Then, the optical communication system 100 is updated to use the symbol constellation 30 newly generated in the step S208 (S210).

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The whole or part of the example embodiments disclosed above can be described as, but not limited to, the following supplementary notes.

SUPPLEMENTARY NOTES

Supplementary Note 1

A symbol constellation generation apparatus comprising:
at least one processor; and
memory storing instructions,
wherein the at least one processor is configured to execute the instructions to:
acquire specification information that represents one or more elements of a specification of an optical communication system, the optical communication system comprising an optical transmitter, an optical receiver, and an optical fiber therebetween;
generate noise characteristics information using the acquired specification information and a first prediction model, the noise characteristics information representing one or more noise characteristics of the optical communication system, the first prediction model being predefined and representing associations between the specification of the optical communication system and noise characteristics of the optical communication system having the specification associated therewith; and
generate a symbol constellation using the generated noise characteristics information and a second prediction model, the symbol constellation being to be used by the optical transmitter to encode a message to be sent to the optical receiver, the second prediction model being predefined and representing associations between the noise characteristics of the optical communication system and the symbol constellation suited to the optical communication system having the noise characteristics associated therewith.

Supplementary Note 2

The symbol constellation generation apparatus according to Supplementary Note 1,
wherein the first prediction model is a machine learning-based model that takes the one or more elements of the specification of the optical communication system as input data and is trained in advance to output the noise characteristics of the optical communication system whose specification is represented by the input data input thereinto.

Supplementary Note 3

The symbol constellation generation apparatus according to Supplementary Note 1 or 2,
wherein the second prediction model is a machine learning-based model that takes the noise characteristics of the optical communication system as input data and is trained in advance to output the symbol constellation suited to the optical communication system whose noise characteristics are represented by the input data input thereinto.

Supplementary Note 4

The symbol constellation generation apparatus according to any one of Supplementary Notes 1 to 3,
wherein the at least one processor is further configured to compute one or more parameters of a noise model as the noise characteristics of the optical communication system.

Supplementary Note 5

The symbol constellation generation apparatus according to Supplementary Note 4,
wherein the noise model represents an amplified spontaneous emission noise or a nonlinear interference noise.

Supplementary Note 6

The symbol constellation generation apparatus according to any one of Supplementary Notes 1 to 5,
wherein the at least one processor is further configured to:
repeatedly acquire the specification information while the optical communication system operates;
generate the symbol constellation in response to the specification information being acquired; and provide the generated symbol constellation to the optical communication system so that the optical communication system is updated to use the generated symbol constellation.

Supplementary Note 7

A control method performed by a computer, comprising:
acquiring specification information that represents one or more elements of a specification of an optical communication system, the optical communication system comprising an optical transmitter, an optical receiver, and an optical fiber therebetween;
generating noise characteristics information using the acquired specification information and a first prediction model, the noise characteristics information representing one or more noise characteristics of the optical communication system, the first prediction model being predefined and representing associations between the specification of the optical communication system and noise characteristics of the optical communication system having the specification associated therewith; and
generating a symbol constellation using the generated noise characteristics information and a second prediction model, the symbol constellation being to be used by the optical transmitter to encode a message to be sent to the optical receiver, the second prediction model being predefined and representing associations between the noise characteristics of the optical communication system and the symbol constellation suited to the optical communication system having the noise characteristics associated therewith.

Supplementary Note 8

The control method apparatus according to Supplementary Note 7,
wherein the first prediction model is a machine learning-based model that takes the one or more elements of the specification of the optical communication system as input data and is trained in advance to output the noise characteristics of the optical communication system whose specification is represented by the input data input thereinto.

Supplementary Note 9

The control method according to Supplementary Note 7 or 8,
wherein the second prediction model is a machine learning-based model that takes the noise characteristics of the optical communication system as input data and is trained in advance to output the symbol constellation suited to the optical communication system whose noise characteristics are represented by the input data input thereinto.

Supplementary Note 10

The control method according to any one of Supplementary Notes 7 to 9, further comprising:
computing one or more parameters of a noise model as the noise characteristics of the optical communication system.

Supplementary Note 11

The control method according to Supplementary Note 10,
wherein the noise model represents an amplified spontaneous emission noise or a nonlinear interference noise.

Supplementary Note 12

The control method according to any one of Supplementary Notes 7 to 11, further comprising:
repeatedly acquiring the specification information while the optical communication system operates;
generating the symbol constellation in response to the specification information being acquired; and
providing the generated symbol constellation to the optical communication system so that the optical communication system is updated to use the generated symbol constellation.

Supplementary Note 13

A computer-readable storage medium storing a program that causes a computer to execute:
acquiring specification information that represents one or more elements of a specification of an optical communication system, the optical communication system comprising an optical transmitter, an optical receiver, and an optical fiber therebetween;
generating noise characteristics information using the acquired specification information and a first prediction model, the noise characteristics information representing one or more noise characteristics of the optical communication system, the first prediction model being predefined and representing associations between the specification of the optical communication system and noise characteristics of the optical communication system having the specification associated therewith; and
generating a symbol constellation using the generated noise characteristics information and a second prediction model, the symbol constellation being to be used by the optical transmitter to encode a message to be sent to the optical receiver, the second prediction model being predefined and representing associations between the noise characteristics of the optical communication system and the symbol constellation suited to the optical communication system having the noise characteristics associated therewith.

Supplementary Note 14

The medium according to Supplementary Note 13,
wherein the first prediction model is a machine learning-based model that takes the one or more elements of the specification of the optical communication system as input data and is trained in advance to output the noise characteristics of the optical communication system whose specification is represented by the input data input thereinto.

Supplementary Note 15

The medium according to Supplementary Note 13 or 14,
wherein the second prediction model is a machine learning-based model that takes the noise characteristics of the optical communication system as input data and is trained in advance to output the symbol constellation suited to the optical communication system whose noise characteristics are represented by the input data input thereinto.

Supplementary Note 16

The medium according to any one of Supplementary Notes 13 to 15,
wherein the program causes the computer to further execute computing one or more parameters of a noise model as the noise characteristics of the optical communication system.

Supplementary Note 17

The medium according to Supplementary Note 16,
wherein the noise model represents an amplified spontaneous emission noise or a nonlinear interference noise.

Supplementary Note 18

The medium according to any one of Supplementary Notes 13 to 17,
wherein the program causes the computer to further execute:
repeatedly acquiring the specification information while the optical communication system operates;
generating the symbol constellation in response to the specification information being acquired; and
providing the generated symbol constellation to the optical communication system so that the optical communication system is updated to use the generated symbol constellation.

REFERENCE SIGNS LIST 10 specification information
20 noise characteristics information
30 symbol constellation
50 first prediction model
60 second prediction model
1000 computer
1020 bus
1040 processor
1060 memory
1080 storage device
1100 input/output interface
1120 network interface
2000 symbol constellation generation apparatus
2020 acquisition unit
2040 first generation unit
2060 second generation unit

What is claimed is:

1. A symbol constellation generation apparatus comprising:
at least one processor; and
memory storing instructions,
wherein the at least one processor is configured to execute the instructions to:
acquire specification information that represents two or more elements of a specification of an optical communication system, the optical communication system comprising an optical transmitter, an optical receiver, and an optical fiber therebetween;
generate noise characteristics information using the acquired specification information and a first prediction model, the noise characteristics information representing one or more noise characteristics of the optical communication system, the first prediction model being predefined and representing associations between the specification of the optical communication system and noise characteristics of the optical communication system having the specification associated therewith; and
generate a symbol constellation using the generated noise characteristics information and a second prediction model, the symbol constellation being to be used by the optical transmitter to encode a message to be sent to the optical receiver, the second prediction model being predefined and representing associations between the noise characteristics of the optical communication system and the symbol constellation suited to the optical communication system having the noise characteristics associated therewith,
wherein the generation of the noise characteristics information including:
calculating one or more parameters of a noise model that represents an amplified spontaneous emission noise as one of the noise characteristics of wavelength division multiplexing (WDM) channels of the optical communication system that is one of the specification of the optical communication system; or
calculating one or more parameters of a noise model that represents a nonlinear interference noise as one of the noise characteristics of the WDM channels of the optical communication system,
wherein a Gaussian noise model for the WDM channels is represented by Equation (1) shown below:

$$X \sim N(0,n) \qquad (1),$$

wherein, in Equation (1), X represents a value of a noise and is normally distributed with a mean value being zero and a variance being n,
wherein a variance $n_{ASE}$ of the Gaussian noise model representing the amplified spontaneous emission noise is represented by Equation (2) shown below:

$$n_{ASE} = 10^{\frac{NF}{10}} h\nu R \sum_k 10^{\frac{A_k}{10}}, \qquad (2)$$

wherein, in Equation (2), NF represents a noise figure of an optical amplifier, h represents the Plank's constant, v represents a channel carrier optical frequency, R represents a symbol rate, k represents a segment number, and $A_k$ represents transmission losses between a k−1 segment to a k segment,
wherein a variance of the Gaussian noise model representing the nonlinear interference noise is represented by Equation (3) and Equation (4) shown below:

$$X_{i,j} \propto \gamma^2 L^2 N_s \phi(\alpha, \beta_2, f, \Delta f), \qquad (3)$$

$$n_{NLI_i} = P_i \sum_j X_{i,j} P_j^2, \qquad (4)$$

wherein, in Equation (3), i and j represent identifiers of the WDM channels where the i th WDM channel is affected by conditions of the j th WDM channel; $X_{i,j}$ represents an efficiency factor nonlinear interference; α, $β_2$, and γ are fiber coefficients of the optical fiber; L represents a length of the optical fiber; $N_s$ represents a number of spans of the optical fiber; f and Δf represent a center frequency and a channel spacing of a communication channel, respectively;

and φ is a functional notation to represent a fact that $X_{i,j}$ depends on α, $β_2$, γ, f, and Δf, and wherein, in Equation (4), $n_{NLi}$ represents a variance of the Gaussian noise model representing the nonlinear interference noise for the i th WDM channel; and $P_i$ represents a transmit power of the i th WDM channel.

2. The symbol constellation generation apparatus according to claim 1,
wherein the second prediction model is a machine learning-based model that takes the noise characteristics of the optical communication system as input data and is trained in advance to output the symbol constellation suited to the optical communication system whose noise characteristics are represented by the input data input thereinto.

3. The symbol constellation generation apparatus according to claim 1,
wherein the at least one processor is further configured to compute one or more parameters of a noise model as the noise characteristics of the optical communication system.

4. A control method performed by a computer, comprising:
acquiring specification information that represents two or more elements of a specification of an optical communication system, the optical communication system comprising an optical transmitter, an optical receiver, and an optical fiber therebetween;
generating noise characteristics information using the acquired specification information and a first prediction model, the noise characteristics information representing one or more noise characteristics of the optical communication system, the first prediction model being predefined and representing associations between the specification of the optical communication system and noise characteristics of the optical communication system having the specification associated therewith; and
generating a symbol constellation using the generated noise characteristics information and a second prediction model, the symbol constellation being to be used by the optical transmitter to encode a message to be sent to the optical receiver, the second prediction model being predefined and representing associations between the noise characteristics of the optical communication system and the symbol constellation suited to the optical communication system having the noise characteristics associated therewith,
wherein the generation of the noise characteristics information including:
calculating one or more parameters of a noise model that represents an amplified spontaneous emission noise as one of the noise characteristics of wavelength division multiplexing (WDM) channels of the optical communication system that is one of the specification of the optical communication system; or
calculating one or more parameters of a noise model that represents a nonlinear interference noise as one of the noise characteristics of the WDM channels of the optical communication system,
wherein a Gaussian noise model for the WDM channels is represented by Equation (1) shown below:

$$X \sim N(0, n) \quad (1),$$

wherein, in Equation (1), X represents a value of a noise and is normally distributed with a mean value being zero and a variance being n, wherein a variance $n_{ASE}$ of the Gaussian noise model representing the amplified spontaneous emission noise is represented by Equation (2) shown below:

$$n_{ASE} = 10^{\frac{NF}{10}} h\nu R \sum_k 10^{\frac{A_k}{10}}, \quad (2)$$

wherein, in Equation (2), NF represents a noise figure of an optical amplifier, h represents the Plank's constant, v represents a channel carrier optical frequency, R represents a symbol rate, k represents a segment number, and $A_k$ represents transmission losses between a k−1 segment to a k segment, wherein a variance of the Gaussian noise model representing the nonlinear interference noise is represented by Equation (3) and Equation (4) shown below:

$$X_{i,j} \propto \gamma^2 L^2 N_s \phi(\alpha, \beta_2, f, \Delta f), \quad (3)$$

$$n_{NLi} = P_i \sum_j X_{i,j} P_j^2, \quad (4)$$

wherein, in Equation (3), i and i represent identifiers of the WDM channels where the i th WDM channel is affected by conditions of the j th WDM channel; $X_{i,j}$ represents an efficiency factor nonlinear interference; α, $β_2$, and γ are fiber coefficients of the optical fiber; L represents a length of the optical fiber; $N_s$ represents a number of spans of the optical fiber; f and Δf represent a center frequency and a channel spacing of a communication channel, respectively; and φ is a functional notation to represent a fact that $X_{i,j}$ depends on α, $β_2$, γ, f, and Δf, and wherein, in Equation (4), $n_{Nuli}$ represents a variance of the Gaussian noise model representing the nonlinear interference noise for the i th WDM channel; and $P_i$ represents a transmit power of the i th WDM channel.

5. A non-transitory computer-readable storage medium storing a program that causes a computer to execute:
acquiring specification information that represents two or more elements of a specification of an optical communication system, the optical communication system comprising an optical transmitter, an optical receiver, and an optical fiber therebetween;
generating noise characteristics information using the acquired specification information and a first prediction model, the noise characteristics information representing one or more noise characteristics of the optical communication system, the first prediction model being predefined and representing associations between the specification of the optical communication system and noise characteristics of the optical communication system having the specification associated therewith; and
generating a symbol constellation using the generated noise characteristics information and a second prediction model, the symbol constellation being to be used by the optical transmitter to encode a message to be sent to the optical receiver, the second prediction model being predefined and representing associations between the noise characteristics of the optical communication system and the symbol constellation suited to the optical communication system having the noise characteristics associated therewith, wherein the generation of the noise characteristics information including:

calculating one or more parameters of a noise model that represents an amplified spontaneous emission noise as one of the noise characteristics of wavelength division multiplexing (WDM) channels of the optical communication system that is one of the specification of the optical communication system; or calculating one or more parameters of a noise model that represents a nonlinear interference noise as one of the noise characteristics of the WDM channels of the optical communication system, wherein a Gaussian noise model for the WDM channels is represented by Equation (1) shown below:

$$X \sim N(0,n) \quad (1),$$

wherein, in Equation (1), X represents a value of a noise and is normally distributed with a mean value being zero and a variance being n, wherein a variance $n_{ASE}$ of the Gaussian noise model representing the amplified spontaneous emission noise is represented by Equation (2) shown below:

$$n_{ASE} = 10^{\frac{NF}{10}} h v R \sum_k 10^{\frac{A_k}{10}}, \quad (2)$$

wherein, in Equation (2), NF represents a noise figure of an optical amplifier, h represents the Plank's constant, v represents a channel carrier optical frequency, R represents a symbol rate, k represents a segment number, and $A_k$ represents transmission losses between a k−1 segment to a k segment, wherein a variance of the Gaussian noise model representing the nonlinear interference noise is represented by Equation (3) and Equation (4) shown below:

$$X_{i,j} \propto \gamma^2 L^2 N_s \phi(\alpha, \beta_2, f, \Delta f), \quad (3)$$

$$n_{NLI_i} = P_i \sum_j X_{i,j} P_j^2, \quad (4)$$

wherein, in Equation (3), i and i represent identifiers of the WDM channels where the i th WDM channel is affected by conditions of the j th WDM channel; $X_{i,j}$ represents an efficiency factor nonlinear interference; α, $β_2$, and γ are fiber coefficients of the optical fiber; L represents a length of the optical fiber; $N_s$ represents a number of spans of the optical fiber; f and Δf represent a center frequency and a channel spacing of a communication channel, respectively; and φ is a functional notation to represent a fact that $X_{i,j}$ depends on α, $β_2$, γ, f, and Δf, and wherein, in Equation (4), $n_{NLI_i}$ represents a variance of the Gaussian noise model representing the nonlinear interference noise for the i th WDM channel; and $P_i$ represents a transmit power of the i th WDM channel.

* * * * *